(12) United States Patent
Okuda et al.

(10) Patent No.: US 7,717,989 B2
(45) Date of Patent: May 18, 2010

(54) W/O EMULSION INK FOR INKJET

(75) Inventors: Sadano Okuda, Tokyo (JP); Tsutomu Nio, Tokyo (JP); Hiroshi Hayashi, Tokyo (JP); Shinichiro Shimura, Tokyo (JP); Takayuki Shimizu, Chiba (JP); Masahiko Abe, Chiba (JP); Hideki Sakai, Chiba (JP); Kenichi Sakai, Chiba (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 12/230,208

(22) Filed: Aug. 26, 2008

(65) Prior Publication Data

US 2009/0090270 A1 Apr. 9, 2009

(30) Foreign Application Priority Data

Aug. 31, 2007 (JP) .............................. 2007-225769

(51) Int. Cl.
*C09D 11/02* (2006.01)

(52) U.S. Cl. .................................................. 106/31.26

(58) Field of Classification Search ............... 106/31.26
See application file for complete search history.

(56) References Cited

U.S. PATENT DOCUMENTS

| | | | | | |
|---|---|---|---|---|---|
| 5,609,670 | A | * | 3/1997 | Okuda et al. | 106/31.26 |
| 5,637,137 | A | * | 6/1997 | Okuda et al. | 106/31.26 |
| 5,759,245 | A | * | 6/1998 | Okuda et al. | 106/31.26 |
| 5,776,232 | A | * | 7/1998 | Okuda et al. | 106/31.26 |
| 5,800,599 | A | * | 9/1998 | Asada | 106/31.26 |
| 5,948,151 | A | * | 9/1999 | Ono et al. | 106/31.26 |
| 6,190,444 | B1 | * | 2/2001 | Okuda et al. | 106/31.26 |
| 6,632,272 | B2 | * | 10/2003 | Hayashi et al. | 106/31.26 |
| 6,699,312 | B2 | * | 3/2004 | Hayashi et al. | 106/31.26 |
| 6,758,888 | B2 | * | 7/2004 | Ogawa et al. | 106/31.26 |

FOREIGN PATENT DOCUMENTS

JP 2006-056931 3/2006

* cited by examiner

*Primary Examiner*—Helene Klemanski
(74) *Attorney, Agent, or Firm*—Fitch, Even, Tabin & Flannery

(57) ABSTRACT

A water-in-oil (W/O) emulsion ink which is suitable for use in inkjet printing and is low in viscosity and superior in storage stability is provided. The ink comprises an oil phase and a water phase emulsified in the oil phase using a nonionic surfactant, in which the water phase contains a salt of at least one metal selected from potassium or calcium. The metal salt is preferably a calcium salt, and particular preferably calcium chloride. The nonionic surfactant is preferably a polyglycerin fatty acid ester, and particularly preferably an esterification product of a polyglycerin and a hydroxy fatty acid. Preferably, the ink comprises 40-99 mass % of the oil phase and 60-1 mass % of the water phase, and contains a polyglycerin fatty acid ester in an amount of 0.5-40 mass % based on the total of the ink.

8 Claims, No Drawings

W/O EMULSION INK FOR INKJET

CROSS-REFERENCE TO RELATED APPLICATION

This application claims the benefit of foreign priority under 35 U.S.C. §119 based on JP 2007-225769, filed Aug. 31, 2007, the entire disclosure of which is hereby incorporated by reference herein.

BACKGROUND OF THE INVENTION (1) Field of the Invention

The present invention relates to a water-in-oil (W/O) emulsion ink which is suitable for use in inkjet printing and is low in viscosity and superior in storage stability.

(2) Description of the Related Art Including Information Disclosed Under 37 CFR 1.97 and 1.98

Inkjet printing is characterized by ejecting ink droplets from fine nozzles so as to perform non-contact printing. Companies have carried out R & D for inks for inkjet printing, aiming at making ink droplets finer and making printing speed faster and printing area larger.

As an ink used for inkjet printing (referred to as "ink for inkjet" in the present application), an aqueous pigment or dye ink is generally used for personal and office uses. Because the aqueous pigment or dye ink is easy to be absorbed into paper fibers, it is high in printing density and low in strike through which is a printing density looked from the backside of prints. On the other hand, since paper is dried under pressure during production, hydrogen bonds between the paper fibers are cut and cause curl when water contacts the paper. This curl is so remarkable as to influence accuracy of positioning of ink droplets and conveyance of paper when cut sheets of paper are used. It is prerequisite to eliminate the curl in order to achieve high speed printing.

As a technique for eliminating the curl, reducing the water content of the ink or removing water from the ink may be employed. In other words, oil based inks can be used to eliminate the curl, which are also suited for high speed printing.

Business printers which adopt a line head type inkjet system are noticed since they have the head fixed so as to produce a large amount of prints at high speed and are available at low price. An oil based ink is usually used for this high speed inkjet printer. However, the ink permeates into the backside of paper after printing, and thus the resulting prints are low in printing density with lots of strike through, compared to printers adopting other systems.

Emulsification of ink is one of the methods for solving this problem (refer to patent document 1). Although emulsification of ink for inkjet can increase printing density and decrease strike through, ink becomes too thick to be ejected from nozzles as droplets when a percentage of a water phase is increased. Moreover, when the ink is inferior in storage stability, it affects ejection of ink so that printing cannot be performed even though the ink viscosity is controlled to be low.

Patent Document 1: JP-A-2006-56931

BRIEF SUMMARY OF THE INVENTION

The object of the present invention is to provide a water-in-oil (W/O) emulsion ink which is suitable for inkjet printing and is low in viscosity and superior in storage stability.

As a result of diligent researches for the above mentioned object, the present inventors have found that a water-in-oil (W/O) emulsion ink low in viscosity and superior in storage stability can be obtained by using a nonionic surfactant as an emulsifier for the water-in-oil (W/O) emulsion ink and allowing the ink to contain a specific metal salt in the water phase thereof, and have finally completed the present invention.

That is, according to the present invention, there is provided a water-in-oil (W/O) emulsion ink for inkjet, having an oil phase and a water phase emulsified in the oil phase using a nonionic surfactant, in which said water phase contains a salt of a metal, said-metal being at least one selected from the group consisting of potassium and calcium.

According to the present invention, a water-in-oil (W/O) emulsion ink which is suitable for inkjet printing and is low in viscosity and superior in storage stability, is obtained because a nonionic surfactant is used as an emulsifier for forming a water-in-oil (W/O) emulsion and a specific metal salt is added to the water phase.

DETAILED DESCRIPTION OF THE INVENTION

Hereinafter, the present invention will be described in detail.

The water-in-oil (W/O) emulsion ink of the present invention is obtained by mixing an oil phase and a water phase and dispersing the water phase as fine particles in the oil phase.

The oil phase is mainly composed of a solvent, a coloring agent and a surfactant, but it may contain other components if necessary.

Any of non-polar solvents and polar solvents may be used as a solvent. These solvents can be used alone or in combination of two or more on condition that they form a single phase. Since polar solvents have an interaction with nonionic surfactants due to hydrogen bond and the like, they have a function of increasing the storage stability. Therefore, it is preferable to use a non-polar solvent together with a polar solvent or a polar solvent alone.

As the non-polar solvent, petroleum based hydrocarbon solvents including naphthenic, paraffinic and isoparaffinic ones can be used. Concrete examples include dodecane and other aliphatic saturated hydrocarbons, "ISOPAR and EXXOL" (both trade names) available from Exxon Mobil Corporation, "AF solvents" (trade name) available from Nippon Oil Corporation, and "SUNSEN and SUNPAR" (both trade names) available from Japan Sun Oil., Ltd. These can be used alone or in combination of two or more.

As the polar solvent, ester solvents, alcohol solvents, higher fatty acid solvents and ether solvents can be used. These can be used alone or in combination of two or more.

Examples of the ester solvents include methyl laurate, isopropyl laurate, isopropyl myristate, isopropyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl isostearate, 2-octyldodecyl pivalate, soybean oil methyl ester, soybean oil isobutyl ester, tall oil methyl ester, tall oil isobutyl ester, diisopropyl adipate, diisopropyl sebacate, diethyl sebacate, propylene glycol monocapric ester, trimethylolpropane tri-2-ethylhexanoic ester, and glycerol tri-2-ethylhexanoic ester.

Examples of the alcohol solvents include higher alcohols such as isomyristyl alcohol, isopalmityl alcohol, isostearyl alcohol, and oleyl alcohol.

Examples of the higher fatty acid solvents include isononanoic acid, isomyristic, acid, hexadecanoic acid, isopalmitic acid, oleic acid, and isostearic acid.

Examples of the ether solvents include glycol ether solvents such as diethyleneglycol monobutyl ether, ethyleneglycol monobutyl ether, propyleneglycol monobutyl ether, and propyleneglycol dibutyl ether.

As a coloring agent, any of dyes and pigments can be used. However, it is preferable to use a pigment because of higher weatherability of prints.

As the pigment, pigments generally used in the printing industry, including organic and inorganic pigments, can be used without any particular limitation. Examples thereof include carbon black, cadmium red, chromium yellow, cadmium yellow, chromium oxide, viridian, titanium cobalt green, ultramarine blue, Prussian blue, cobalt blue, azo pigments, phthaiocyanine pigments, quinacridone pigments, isoindolinone pigments, dioxadine pigments, threne pigments, perylene pigments, thioindigo pigments, quinophtalone pigments and metal complex pigments. These pigments may be used alone or in combination of two or more.

As the dye, oil-soluble dyes such as azo, anthraquinone and azine based dyes can be used.

The coloring agent is contained preferably in an amount of 0.01 to 20 mass % based on the total of the ink.

When a pigment is used as a coloring agent, it is preferable to add a pigment dispersing agent to the oil phase in order to make good dispersion of the pigment in the oil phase. The pigment dispersing agents used in the present invention are not particularly limited as long as they can stably disperse the pigment in a solvent. Examples thereof include hydroxyl group-containing carboxylic acid ester, a salt of a long-chain polyaminoamide and a high-molecular-weight acidic ester, a salt of a high-molecular-weight polycarboxylic acid, a salt of a long-chain polyaminoamide and a polar acidic ester, high-molecular-weight unsaturated acid ester, high-molecular-weight copolymer, modified polyurethane, modified polyacrylate, polyetherester type anionic surfactant, naphthalene sulfonic acid formalin condensate salt, polyoxyethylene alkylphosphoric acid ester, polyoxyethylene nonylphenyl ether, polyesterpolyamine, stearylamine acetate and the like. Of these, polymeric dispersing agents are preferably used. Examples of the dispersing agents include "SOLSPERSE 5000 (phthalocyanine ammonium salt based), 13940 (polyester amine based), 17000, 18000 (aliphatic amine based), 11200, 22000, 24000, and 28000" (all trade names) available from Lubrizol Japan Ltd.; "EFKA 400, 401, 402, 403, 450, 451, 453 (modified polyacrylate), 46, 47, 48, 49, 4010, 4055 (modified polyurethane)" (all trade names) available from Efka Chemicals; "DEMOL P, EP, POIZ 520, 521, 530, HOMOGENOL L-18 (polycarboxylate polymer type surfactants)" (all trade names) available from Kao Corporation; "DISPARLON KS-860, KS-873N4 (polyester amine salt)" (both trade names) available from Kusumoto Chemicals, Ltd.; and "DISCOL 202, 206, OA-202, OA-600 (multichain polymeric nonionic based)" (all trade names) available from Daiichi Kogyo Seiyaku Co., Ltd.

The pigment dispersing agents may be contained in an amount sufficient to disperse the pigment in the oil phase, and can be set properly.

The nonionic surfactant includes, but is not limited to, sorbitan higher fatty acid esters such as sorbitan monolaurate, sorbitan monopalmitate, sorbitan monostearate, sorbitan tristearate, sorbitan monooleate and sorbitan sesquioleate; fatty acid glycerides; polyglycerin fatty acid esters; fatty acid diglycerides; and ethylene oxide addition products of higher alcohols, alkylphenols and fatty acids.

Of these, polyglycerin fatty acid esters which form a stable water-in-oil (W/O) emulsion rich in the water phase are specifically preferred. Polyglycerin fatty acid esters herein means esterification products of fatty acids with polyglycerins obtained from dehydrating condensation of glycerin. The polyglycerin fatty acid ester is preferably one which has a degree of polymerization of glycerin of 4 to 12 moles, to which several moles (for example, 1 to 10 moles) of a higher fatty acid are ester-bonded. As the higher fatty acids, fatty acids with 8-24 carbon atoms are preferred, among which hydroxy fatty acids are more preferred. Preferred examples of hydroxy fatty acids include ricinoleic acid, hydroxylauric acid, hydroxymyristic acid, hydroxypalmitic acid, hydroxystearic acid, hydroxybehenic acid, hydroxytridecanoic acid, hydroxypentadecanoic acid, hydroxymargaric acid, hydroxyoctadecanoic acid, hydroxynonadecanoic acid, hydroxyarachic acid, and ricinelaidic acid. Preferred examples of polyglycerin fatty acid esters include polyricinoleic acid decaglyceryl and polyricinoleic acid hexaglyceryl.

The HLB of nonionic surfactants is preferably 3 to 8 because the water-in-oil (W/O) emulsion can be easily formed, and more preferably 3 to 5 because printing density is enhanced.

The amount of the nonionic surfactant to be used in the present invention on-solid mass basis is preferably 0.5 to 40 mass %, more preferably 1.0 to 15 mass %, and further more preferably 2.0 to 12 mass % based on the total amount of the ink. If it is less than 0.5 mass %, no improvement of storage stability of emulsion can be expected. Also, if it is more than 40 mass %, viscosity becomes too high to be suitable for inkjet.

The oil phase can be prepared, for example, by putting the whole or parts of the components in a known dispersing machine such as a beads-mill to obtain a dispersion and if necessary passing it through a known filtering machine like a membrane filter. For example, it can be prepared by obtaining a mixture of a part of the solvent and the whole of the pigment and pigment dispersing agent and dispersing them in a dispersing machine, and then adding the rest of the components to the dispersion followed by filtering.

The water phase is composed of water and a metal salt dissolved therein. In the present invention, the metal salt is a salt of at least one metal selected from potassium and calcium, and is preferably a calcium salt. These metal salts are preferably chlorides. These metal salts have an effect of stabilizing the emulsion without increasing the viscosity of the emulsion ink. Of these metal salts, calcium chloride is particularly preferred since the storage stability of emulsion is highly improved.

The water phase may further contain an electrolyte, a moisturizing agent, a water-soluble polymer, an oil-in-water (O/W) emulsion of resin, a fungicide, an antiseptic, a pH controller, a freeze preventing agent and the like, if necessary.

The water-in-oil (W/O) emulsion ink for inkjet according to the present invention can be produced by mixing and emulsifying the oil phase and the water phase. Emulsification can be conducted by previously preparing the water phase and the oil phase separately from each other, and then adding the water phase liquid to the oil phase liquid. Alternatively, emulsification can be conducted after the oil phase components are wholly or separately added to the water phase. A known emulsifying machine such as a disper mixer, a homomixer and the like can be used for the preparation. The water phase dispersed by emulsification preferably has a particle diameter ranging from 0.1 to 2.0 µm.

The ink for inkjet according to the present invention comprises 40 to 99 mass % of an oil phase and 60 to 1 mass % of a water phase. A water-in-oil (W/O) emulsion is difficult to be formed if the percentage of the water phase exceeds 60 mass %. If the percentage of the water phase is below 1 mass %, printing density may lower or strike through may occur in prints. Generally, there is a tendency that the higher the percentage of the water phase is, the higher the viscosity of the ink becomes. Thus, a preferred blending percentage of the two phases is 55 to 99 mass % of the oil phase and 45 to 1 mass % of the water phase.

The viscosity of the thus-obtained present water-in-oil (W/O) emulsion ink for inkjet at 23° C. is preferably set within the range from 3 to 100 mPas, more preferably within the range from 5 to 30 mPas, and particularly preferably within the range from 10 to 20 mPas. The viscosity of the ink can be adjusted by controlling kinds and amounts of the components of the oil phase and amounts or contents of the water phase or the metal salt contained therein. Generally, there is a tendency that the lesser the amount of the water phase and/or nonionic surfactant is, the lower the viscosity of the ink is, but also the lower the storage stability of emulsion is. In the present invention, the water-in-oil (W/O) emulsion ink keeping the storage stability of emulsion with a lower viscosity can be obtained by adding the above specific metal salt to the water phase, even when the content of the water phase is low.

EXAMPLE

Hereinafter, the present invention will be described in detail by way of examples, however, the present invention is not limited to these examples.

Examples 1-5, Comparative Examples 1-5

A water-in-oil (W/O) emulsion ink was prepared by dropping a water phase having a composition indicated in Table 1 or 2 into an oil phase having a composition indicated in Table 1 or 2 under stirring for 5 minutes at 3,000 rpm using an express homogenizer VISCOTRON available from Microtech Nichion Corporation until the compositional ratio shown in the same Table was met, and then continuing the stirring for 5 minutes at 10,000 rpm. The amount of each component in Tables 1 and 2 is indicated in mass %.

The inkjet inks obtained in the above Examples and Comparative Examples were each evaluated on viscosity and storage stability of emulsion in accordance with the following methods. The results of evaluation are shown in Tables 1 and 2.

(1) Viscosity of Ink

It was measured with RS75 RheoStress (trade name) manufactured by HAAKE Corporation.

Percentage of viscosity indicated in Tables 1 and 2 is the percentage relative to the respective Comparative Example indicated in the same Table.

(2) Storage Stability of Ink

The prepared ink was left at room temperature, and the condition of emulsion was visually observed. Evaluation was carried out according to the following standards.

xx: water phase was separated in 1 hour.
x: water phase was separated in several hours.
Δ: water phase was separated in 1 day.
○: water phase was separated in 1 week.
⊚: water phase was stable for more than 1 month.

TABLE 1

| | | | Example 1 | Example 2 | Example 3 | Example 4 | Example 5 |
|---|---|---|---|---|---|---|---|
| Oil phase | Pigment | MA-8 | 5.000 | 5.000 | 5.000 | 5.000 | 5.000 |
| | Pigment dispersing agent | SOLSPERSE 13940 | 3.000 | 3.000 | 3.000 | 3.000 | 3.000 |
| | Solvent | AF-7 | 51.125 | 51.125 | 51.125 | 51.125 | 82.688 |
| | Surfactant | Sorbitan monooleate (HBL 4.3) | 3.000 | 3.000 | — | — | — |
| | | Polyricinoleic acid hexaglyceryl (HBL 3.5) | — | — | 3.000 | 3.000 | 3.000 |
| Water phase | Water | Ion-exchanged water | 30.000 | 30.000 | 30.000 | 30.000 | 5.000 |
| | Metal salt | Potassium chloride (KCl) | 0.375 | — | 0.375 | — | — |
| | | Calcium chloride (CaCl$_2$) | — | 0.375 | — | 0.375 | 0.062 |
| | | Magnesium sulfate (MgSO$_4$) | — | — | — | — | — |
| | | Sodium sulfate (Na$_2$SO$_4$) | — | — | — | — | — |
| | Moisturizer | Glycerin | 7.500 | 7.500 | 7.500 | 7.500 | 1.250 |
| Total | | | 100.000 | 100.000 | 100.000 | 100.000 | 100.000 |
| Evaluation Result | Viscosity | Viscosity at 23 degree C. (mPa·s) | 43.8 | 39.8 | 95.5 | 94.0 | 11.9 |
| | | Percentage | 1.1 | 1.0 | 1.1 | 1.1 | 1.0 |
| | | Viscosity as denominator | Comparative Example 1 | Comparative Example 1 | Comparative Example 2 | Comparative Example 2 | Comparative Example 3 |
| | Storage stability (r.t.) | | Δ | ○ | ○ | ⊚ | ⊚ |

TABLE 2

| | | | Comparative Example 1 | Comparative Example 2 | Comparative Example 3 | Comparative Example 4 | Comparative Example 5 |
|---|---|---|---|---|---|---|---|
| Oil phase | Pigment | MA-8 | 5.000 | 5.000 | 5.000 | 5.000 | 5.000 |
| | Pigment dispersing agent | SOLSPERSE 13940 | 3.000 | 3.000 | 3.000 | 3.000 | 3.000 |
| | Solvent | AF-7 | 51.500 | 51.500 | 82.750 | 51.125 | 51.125 |
| | Surfactant | Sorbitan monooleate (HBL 4.3) | 3.000 | — | — | — | 3.000 |
| | | Polyricinoleic acid hexaglyceryl (HBL 3.5) | — | 3.000 | 3.000 | 3.000 | — |

TABLE 2-continued

|  |  |  | Comparative Example 1 | Comparative Example 2 | Comparative Example 3 | Comparative Example 4 | Comparative Example 5 |
|---|---|---|---|---|---|---|---|
| Water phase | Water | Ion-exchanged water | 30.000 | 30.000 | 5.000 | 30.000 | 30.000 |
|  | Metal salt | Potassium chloride (KCl) | — | — | — | — | — |
|  |  | Calcium chloride (CaCl$_2$) | — | — | — | — | — |
|  |  | Magnesium sulfate (MgSO$_4$) | — | — | — | 0.375 | — |
|  |  | Sodium sulfate (Na$_2$SO$_4$) | — | — | — | — | 0.375 |
|  | Moisturizer | Glycerin | 7.500 | 7.500 | 1.250 | 7.500 | 7.500 |
| Total |  |  | 100.000 | 100.000 | 100.000 | 100.000 | 100.000 |
| Evaluation Result | Viscosity | Viscosity at 23 degree C. (mPa · s) | 39.0 | 85.0 | 11.9 | 349.0 | 35.0 |
|  |  | Percentage | 1.0 | 1.0 | 1.0 | 4.1 | 0.9 |
|  |  | Viscosity as denominator | Comparative Example 1 | Comparative Example 2 | Comparative Example 3 | Comparative Example 2 | Comparative Example 1 |
|  | Storage stability (r.t.) |  | X X | X X | X | X | X X |

Symbols in Tables 1 and 2 mean as follows:

MA-8: Carbon black MA-8 (trade name) available from Mitsubishi Chemical Corporation.

SOLSPERSE 13940: Pigment dispersing agent SOLSPERSE 13940 (trade name) available from Lubrizol Japan Ltd.

AF-7: Petroleum based hydrocarbon solvent AF-7 (trade name) available from Nippon Oil Corporation.

Sorbitan monooleate (HLB 4.3): NIKKOL SO-10V (trade name) available from Nikko Chemical Corporation.

Polyricinoleic acid hexaglyceryl (HLB 3.5): NIKKOL Hexaglyn PR-15 (trade name) available from Nikko Chemical Co., Ltd.

From the results of Table 1, it is found that the rise of viscosity was minimized and the storage stability was improved due to the addition of potassium salt or calcium salt to the water phase in Examples 1 to 5. Also, the storage stability was improved remarkably in Examples of 4 and 5 in which a polyglycerin fatty acid ester was used as a nonionic surfactant and a calcium salt was used as a metal salt.

On the other hand, in Comparative Examples 1 to 3 in which the water phase contained no metal salt, the storage stability was inferior although the viscosity of ink was kept low. In Comparative Example 4 in which magnesium sulfate was added to the water phase as a metal salt, the viscosity of ink increased vigorously and the storage stability was inferior. In Comparative Example 5 in which sodium sulfate was added to the water phase as a metal salt, the storage stability was remarkably inferior although the viscosity of ink was kept low.

Since the water-in-oil (W/O) emulsion ink for inkjet according to the present invention is low in viscosity and superior in storage stability, it can be used as an ink in the field of inkjet printing, particularly for business printers which adopt the line head type inkjet system.

The invention claimed is:

1. A water-in-oil (W/O) emulsion ink for inkjet, having an oil phase and a water phase emulsified in the oil phase using a nonionic surfactant, in which said water phase contains calcium chloride.

2. A water-in-oil (W/O) emulsion ink for inkjet according to claim 1, in which said nonionic surfactant is a polyglycerin fatty acid ester.

3. A water-in-oil (W/O) emulsion ink for inkjet according to claim 2, which comprises 40-99 mass % of the oil phase and 60-1 mass % of the water phase, and contains said polyglycerin fatty acid ester in an amount of 0.5-40 mass % based on the total of the ink.

4. A water-in-oil (W/O) emulsion ink for inkjet according to claim 3, in which said polyglycerin fatty acid ester is an esterification product of a polyglycerin and a hydroxyl fatty acid.

5. A water-in-oil (W/O) emulsion ink for inkjet according to claim 3, which has a viscosity at 23° C. of 3 to 100 mPas said polyglycerin fatty acid ester is an esterification product of a polyglycerin and a hydroxyl fatty acid.

6. A water-in-oil (W/O) emulsion ink for inkjet according to claim 1, which has a viscosity at 23° C. of 5 to 30 mPas.

7. A water-in-oil (W/O) emulsion ink for inkjet according to claim 1, which has a viscosity at 23° C. of 10 to 20 mPas.

8. A water-in-oil (W/O) emulsion ink for inkjet having 55 to 99 mass % of an oil phase and 45 to 1 mass % of a water phase emulsified in the oil phase using a nonionic surfactant, in which said water phase contains an effective emulsion stabilizing amount of calcium chloride.

* * * * *